(12) United States Patent
Enderlin et al.

(10) Patent No.: US 11,878,597 B2
(45) Date of Patent: Jan. 23, 2024

(54) WIRELESS POWER TRANSFER ARRANGEMENT

(71) Applicant: Delta Electronics (Thailand) Public Co., Ltd., Samutprakarn (TH)

(72) Inventors: Jonas Enderlin, Teningen (DE); Michael Mentele, Teningen (DE); Ulrich Richter, Freiburg (DE); Yibo Wang, Emmendingen (DE)

(73) Assignee: DELTA ELECTRONICS (THAILAND) PCL., Amphur Muang (TH)

( * ) Notice: Subject to any disclaimer, the term of this patent is extended or adjusted under 35 U.S.C. 154(b) by 224 days.

(21) Appl. No.: 17/192,855

(22) Filed: Mar. 4, 2021

(65) Prior Publication Data
US 2021/0276436 A1 Sep. 9, 2021

(30) Foreign Application Priority Data
Mar. 5, 2020 (EP) ..................................... 20161272

(51) Int. Cl.
*H02J 7/00* (2006.01)
*B60L 53/126* (2019.01)
(Continued)

(52) U.S. Cl.
CPC .............. *B60L 53/126* (2019.02); *B60L 50/60* (2019.02); *B60L 53/12* (2019.02); *B60L 53/122* (2019.02);
(Continued)

(58) Field of Classification Search
CPC ...... B60L 53/126; B60L 53/12; B60L 53/122; B60L 53/66; B60L 53/305; B60L 50/60;
(Continued)

(56) References Cited

U.S. PATENT DOCUMENTS 9,287,040 B2 3/2016 Petersen et al.
2011/0279226 A1 11/2011 Chen et al.
(Continued)

FOREIGN PATENT DOCUMENTS

EP 3 315 351 A2 5/2018
EP 3 591 824 A1 1/2020
(Continued)

OTHER PUBLICATIONS

European Search Report dated Sep. 16, 2020, 38 pages.

*Primary Examiner* — Zixuan Zhou
(74) *Attorney, Agent, or Firm* — Vector IP Law Group; Robert Babayi

(57) ABSTRACT

A wireless power transfer arrangement (20) for a wireless power transfer across an airgap (9) by inductive coupling, for example for charging the battery (31) of an electric vehicle, includes a primary side (21) with a primary pad (22) for generating a magnetic field (28) into the airgap (9) and a secondary side (24) arranged on the other side of the airgap (9) that picks up the magnetic field (28) and provides the energy received through the magnetic field (28) to the battery (31). The primary side (21) is for example installed at a charging station and the secondary side (24) is comprised by the electric vehicle. In order to control the charging process during the power transfer, a wireless communication channel (38) is provided between the primary (21) and the secondary (24) by means of two wireless transceivers (35, 36). According to the invention, the wireless transceivers (35, 36) are adapted such that their communication range is less than twice a largest spatial extent of the primary pad. In this way, the communication between the charging station and the vehicle may not be received by other charging stations or vehicles located at the same charging area. And if the other vehicles and other charging stations of the same charging area are adapted according to the invention as well, (Continued)

their communication does not interfere with each other or otherwise disturb each other such that a complex and laborious pairing process may be avoided.

19 Claims, 4 Drawing Sheets

(51) Int. Cl.
| | | |
|---|---|---|
| *H02J 50/80* | (2016.01) | |
| *H02J 50/12* | (2016.01) | |
| *B60L 50/60* | (2019.01) | |
| *B60L 53/66* | (2019.01) | |
| *B60L 53/30* | (2019.01) | |
| *B60L 53/122* | (2019.01) | |
| *H02J 50/40* | (2016.01) | |
| *H02J 7/02* | (2016.01) | |
| *B60L 53/12* | (2019.01) | |
| *H02J 50/10* | (2016.01) | |

(52) U.S. Cl.
CPC ............. *B60L 53/305* (2019.02); *B60L 53/66* (2019.02); *H02J 7/02* (2013.01); *H02J 50/10* (2016.02); *H02J 50/12* (2016.02); *H02J 50/402* (2020.01); *H02J 50/80* (2016.02); *B60L 2200/42* (2013.01)

(58) Field of Classification Search
CPC ....... B60L 2200/42; H02J 50/10; H02J 50/12; H02J 50/402; H02J 50/80; H02J 7/02
USPC ..................... 320/108, 109; 307/104; 701/22
See application file for complete search history.

(56) References Cited

U.S. PATENT DOCUMENTS

| | | | |
|---|---|---|---|
| 2013/0093387 A1 | 4/2013 | Vassilieff et al. | |
| 2015/0042168 A1* | 2/2015 | Widmer | ................ B60L 53/126 |
| | | | 307/104 |
| 2016/0126746 A1 | 5/2016 | Keeling et al. | |
| 2017/0271908 A1* | 9/2017 | Li | ....................... G01R 27/2688 |
| 2018/0219400 A1* | 8/2018 | Jin | .......................... H01F 38/14 |
| 2018/0272885 A1* | 9/2018 | Halker | .................. B60L 53/126 |
| 2019/0080840 A1* | 3/2019 | Budhia | ................... H02J 50/70 |

FOREIGN PATENT DOCUMENTS

| | | | | |
|---|---|---|---|---|
| EP | 3315351 B1 * | 5/2022 | ............. B60L 53/12 | |
| JP | 2008288889 A | 11/2008 | | |

* cited by examiner

WIRELESS POWER TRANSFER ARRANGEMENT

TECHNICAL FIELD

The invention relates to a wireless power transfer arrangement for a wireless power transfer across an airgap by inductive coupling for charging an energy storage of an electric vehicle, wherein the wireless power transfer arrangement includes a primary unit, a secondary unit comprised by the electric vehicle and a controller for controlling the power transfer, the primary unit includes a wireless transceiver and a primary pad for inducing a magnetic field into the airgap, the secondary unit includes a wireless transceiver and a secondary pad for receiving the power transferred through the magnetic field, the wireless transceivers include an antenna for transmitting and receiving a communication signal and are adapted for providing a wireless communication link between the primary unit and the secondary unit.

BACKGROUND

Electric vehicles (EV) have become more and more popular. The term electric vehicle may for example include automotive vehicles such as cars, lorries, motorbikes, trains, boats, ships, submarines, planes, helicopters and the like but also industrial vehicles such as forklifts, AGVs (automated guided vehicles), cleaning machines, elevators and the like. Electric vehicles usually include an electric motor for driving the vehicle and they usually include an energy storage to supply the electric motor with energy. The power stored in the energy storage may for example also be used to operate electrically driven equipment of such EVs for lifting, displacing or transporting goods of any kind.

In most cases the energy storage is a battery that can be recharged. Recharging usually takes place at a dedicated charging area. Often, such a charging area includes multiple charging stations where two or more vehicles may charge their battery simultaneously. Each charging station is in most cases permanently installed at the charging area, for example on a wall or at the bottom of the site. For charging the battery of an EV, the vehicle is moved to the charging area and then parked near one of the charging stations where power may be transmitted from that charging station to the vehicle.

Whereas lead-acid batteries have been and still are used, Li-Ion batteries are being used more and more frequently as the traction battery of EVs. Li-Ion batteries have the advantage that they may be charged with high c-rates of up to 1 c which reduces the charging time. A Li-Ion battery with a capacity of 600 ampere hours (Ah) may accordingly be charged with a current of up to 600 Amperes (A) which reduces the charging time down to about one hour whereas a lead-acid battery with the same capacity may only be charged with a c-rate of about 0.1 c to 0.2 c resulting in a charging time of five to ten hours. Moreover, Li-Ion batteries can be charged occasionally without doing damage to the battery which would happen with lead-acid batteries when applying multiple short charging cycles for just a small number of minutes.

The high charging currents with Li-Ion batteries may however cause problems with a wire-based charger where the charging current is fed from a charging station to vehicle via a cable connection where the cable is connected to the source and/or the battery by connectors. The high charging currents would require a charging cable with a large copper diameter and heavy duty connectors. Accordingly, the charging cables are difficult to handle and the connectors would wear out fast. With an occasional charging such connectors would wear out within weeks.

To overcome the problems with the charging cables the charging of such batteries often is done by wireless power transfer. Such a wireless power transfer system is also designated as a wireless charging system (WCS) or as an inductive power transfer (IPT) system in case the power is transferred wirelessly by inductive coupling. Such systems do work with loosely coupled inductors.

The primary side of such a wireless power transfer arrangement is usually connected to a power grid such as a mains supply or any other electric supply network capable of providing the required amount of electric power. The power received from the grid is then converted to an AC power which is fed to a primary pad. The primary pad includes a resonator that generates a magnetic field that is more or less directed in a certain direction. The secondary side of such a wireless power transfer arrangement usually is comprised by the EV and includes a secondary pad with a resonator that picks up the magnetic field and provides an AC power at its output. Accordingly, the vehicle has to be correctly positioned such that the magnetic field generated by the primary side is mainly directed to the secondary pad of the vehicle. The AC power received by the secondary pad may then for example be used to charge the battery of the vehicle or to directly drive any electrical load of the vehicle. Of course, the AC power provided by the secondary pad may first be converted into a suitable form to charge the battery or to drive the load.

To control the power transfer, the system may include a controller in the primary and a separate controller in the secondary that do not communicate with each other such as for example described in U.S. Pat. No. 9,287,040 B2, Thoratec Corporation.

Another option to control the power transfer is to provide a communication link between the primary and the secondary such that the power transfer control may be based on information of the primary as well as the secondary. Such a communication link is also required for a closed loop control of the power transfer during charging of the battery. Such a communication link might either be a wired or a wireless communication link. Wireless communication links are however preferred for a wireless charging process. It would be an additional effort to first establish a communication link between the charging station and the EV by connecting a suitable cable between the charging station and the EV before the charging process may start, even more so as such a connection would in most cases have to be established manually.

Document EP 3 591 824 A1, Delta Electronics (Thailand) Public Co. discloses such a wireless charging system including a wireless communication link between the primary and the secondary for control purposes. This document mentions a number of communication technologies such as LTE, UMTS, GSM, WLAN and Bluetooth.

Although it is generally a good idea to use wireless communication between the primary and the secondary, such technologies do also have a major drawback, particularly in the case where multiple charging stations are provided at a charging area. Due to the communication range of these technologies from several tens of meters up to some hundreds of meters, each charging station may receive the communication of each vehicle positioned in or near the charging area. And each vehicle may receive the communication of each charging station of the charging area. Accordingly, the pairing process, i. e. the process to pair the vehicle with the correct charging station to set up the charging process, is difficult, particularly in the case where two vehicles arrive at the charging area at the same time. A high effort must be done to distinguish who is communicating with whom.

For instance, all charging stations and vehicles could be assigned a unique address, such that a vehicle can address a particular charging station. However in this case also the vehicle must know the address and physical location of that particular primary, to drive to it and give notice to the vehicles secondary regarding the address of the primary.

Another way where the vehicle doesn't need to know the addresses-location-correlation of the charging stations is that the secondary and the primary go through an arbitration routine at each start of charging. This could for example be done in that the secondary, after entering the charging area, is sending a request to get charge combined with a temporary address of itself. This request is received by all primaries in reach. All free primaries start up and try to give charge to a secondary. Now only the charging station in front of which the vehicle is standing is able to give charge, so it will know that the requesting vehicles secondary is in front of it and keep on charging. All other charging stations will go to standby again. To complete the pairing the charging stations gives notice about its temporary address to the vehicle. For the rest of the charging process the two have identified each other and can ignore any other broadcast. Or in other words, once the pairing process has finished, the charging station and the vehicle know each other's address such that they may communicate with each other to exchange data for controlling the charging process.

Such a pairing process is however rather complicated. It requires a lot of time, a dedicated protocol and may even require additional hardware.

The known communication links do have a further drawback. As typically all charging stations of a charging area as well as all vehicles intended to be charged at that charging area make use of the same frequency band for communication, interferences are likely to happen. Moreover, the more stations and vehicles use the same frequency band, the higher becomes the probability of collisions and blocked channels. Additionally, in an industrial environment, certain frequency bands such as for example the 2,4 GHz band are used for data traffic by many different other applications as well and are therefore extremely busy. All in all, this not only makes communication more difficult but may accordingly also consume more time than necessary and result in communication interruptions.

SUMMARY OF THE INVENTION

It is therefore an object of the invention to create a wireless power transfer arrangement pertaining to the technical field initially mentioned, that allows for a simplified pairing process as well as a simple and undisturbed communication during charging. Further objects of the invention are to provide a primary or secondary pad for such a wireless power transfer arrangement as well to provide a corresponding method for a wireless power transfer.

The solution of the invention is specified by the features of claim 1. A wireless power transfer arrangement for a wireless power transfer across an airgap by inductive coupling for charging an energy storage of an electric vehicle, includes a primary unit, a secondary unit comprised by the electric vehicle and a controller for controlling the power transfer, wherein the primary unit includes a wireless transceiver and a primary pad for inducing a magnetic field into the airgap, the secondary unit includes a wireless transceiver and a secondary pad for receiving the power transferred through the magnetic field, and the wireless transceivers include an antenna for transmitting and receiving a communication signal and are adapted for providing a wireless communication link between the primary unit and the secondary unit.

According to the invention, the wireless communication link has a communication range that is less than twice a largest spatial extent of the primary pad and wherein the controller is adapted to control the power transfer based on data transmitted through the wireless communication link during the power transfer.

Whereas the secondary unit with the secondary pad is comprised by the vehicle, the primary unit as well as the primary pad usually form a part of the charging station and are therefore permanently installed at a premises such as a charging area. However, the primary unit or just the primary pad may also be movable such that the primary unit or the pad may be correctly positioned near the vehicle for enabling the power transfer.

The largest spatial extent of the primary pad depends on the size of the primary pad wherein the size of the pad depends on the requirements of a particular application. Smaller pads may for example be used in cases where smaller amounts of power are to be transferred and larger pads may be used in cases where larger amounts of power are to be transferred. Smaller pads may for example also be used in cases where the available space is restricted or where the secondary side is to be integrated into a smaller vehicle. Then again, if the vehicle is large or the available space is large, larger pads may be used, independent of whether the amount of power to be transferred is large or small. The size of the pad may also depend on other circumstances of a particular application such as for example the environmental conditions or the requirements regarding the precision of the mutual positioning of the pads.

The largest spatial extent of the primary pad usually corresponds to its largest diameter perpendicular to the direction of power transfer. If the primary pad for example is a circular pad its largest spatial extent usually is the diameter of the circular pad. If the primary pad is a rectangular pad its largest spatial extent usually is the diagonal of the pad. In the following the largest spatial extent of a pad is designated as the diagonal of the pad.

The diagonal of typical primary pads ranges from about 10 or 15 centimeters (cm) up to two or even more meters (m). Such pads are usually circular or rectangular. Other shapes and sizes are however also possible.

By using a communication link having a rather short communication range of less than twice the diagonal of the corresponding primary pad, the above drawbacks may be avoided. Due to the short communication range, a communication signal sent by a certain charging station may only be received by a vehicle that is positioned in the immediate vicinity of the charging station. Accordingly, only a vehicle that is to be charged by a particular charging station may receive the communication signals sent by that charging station. And of course, this also applies vice versa.

In order to have the battery of an EV charged, the EV has therefore just to be positioned in charging position near a free charging station and then the charging station and the vehicle may start communication without interfering or otherwise disturbing or being disturbed by the communication of other charging stations and vehicles in the charging area. The other charging stations and vehicles do simply not notice the communication between a charging station and the vehicle that is to be charged at that station. And of course, the communication between a pair of charging station and vehicle is not interfered or otherwise disturbed by the communication of other pairs. The same is of course also true for third party devices, i. e. different from the involved charging stations and vehicles, that are transmitting signals in the same area.

Accordingly, the need for a particular method to detect charging pairs for power transmission (charging station and vehicle) may be avoided.

The pairing process is therefore very simple and just includes a communication request by the charging station or the vehicle and a corresponding answer by the other communication partner. There is no need to assign any addresses to identify the other communication partner. In a preferred embodiment of the invention, the pairing process is started by the vehicle in that it sends a communication request as soon as it is positioned in front of a certain charging station. If the vehicle is positioned correctly in front of a charging station, the charging station may receive the communication request and answering accordingly. Therefore, the vehicles transceiver is the master and the transceiver of the charging station acts as a slave. As soon as the pairing is finished, the vehicle and the charging station may communicate with each other by exchanging data as required by a particular application. For example, they may exchange information during the power transfer from the charging station to the vehicle that is required by a controller to control the process of charging the vehicles battery such that the power provided to the vehicles battery matches the amount of power required by the battery at a particular point in time during the charging process.

Moreover, due to the limited communication range, collisions and blocked channels during communication may be avoided or at least reduced to a large extent which also results in faster and more reliable communication.

In the context of this description, the term communication range refers to the spatial area or distance from the sender within which a receiver may receive the signals sent by a sender with a reasonable quality wherein the term sender in this respect refers to the Antenna of the sender that is the source of the transmission signal. Or in other words, the term communication range refers to the area or distance from the sender within which the data transferred may be retrieved from the communication signal by the receiver in a sufficient quality. Depending on the coding schemes, protocols, error corrections, algorithms etc. used for communication, the communication signal may correctly be received at different distances from the sender.

Further, it is to consider that the communication range may not be the same in every direction seen from the sender. Antennas may emit a directed signal such that the communication range is higher in a certain direction than the communication range in another direction. In the application of power transfer from a charging station to a vehicle, the communication direction may also be directed from the station in the direction where the vehicle is supposed to be positioned for power transfer and also from the vehicle in the direction of the station.

The term unit as used in this text does not necessarily refer to a physical unit that includes all components of that unit. Unless otherwise mentioned, the term unit rather refers to a logical unit that may encompass one or more physical units. For example, the term primary unit refers to a combination of several components such as a for example an input stage for converting the power received from a power grid to an AC power and a primary resonator for receiving the AC power and for inducing a magnetic field. Both components may or may not be provided in a single physical unit.

In a preferred embodiment of the invention, the energy storage includes a battery, particularly a traction battery of the vehicle. Such batteries are available for EVs with reasonable capacities of several hundreds or even some thousands of Ah.

Depending on the requirements of a particular application, the energy storage may alternatively or in addition also include capacitive storage elements such as for example supercaps or other capacitors. If for example high charging and discharging rates are required, supercaps might be a good choice.

As the primary and the secondary pad are usually positioned next to each other in order to transfer power from the primary to the secondary, the communication range is preferably even less than the diagonal of the primary pad.

The distance between the primary and the secondary pad during power transfer is usually in the range from some centimeters up to 20 cm or 30 cm. In some cases however, the pads may be arranged in a larger distance of up to about 50 cm. In an even more preferred embodiment of the invention, the communication range is preferably less than the diagonal of the primary pad but more than 5 cm.

It would however also be possible to design the antenna and the electronics of the transceivers such that the communication range is below 5 cm or twice the diagonal of the primary pad and above.

Generally, a broad range of frequencies may be used for the wireless communication. The transceivers may for example be adapted for a communication using radio frequencies somewhere between 3 kHz and 1 GHz, depending i. a. on what frequency range for example is available for a particular use at a given location.

In a preferred embodiment of the invention, a frequency in the medium frequency (MF) range to the very high frequency (VHF) range is used, i. e. somewhere between 300 kHz and 300 MHz.

In an even more preferred embodiment, the transceivers are adapted for a communication using a frequency between 3 MHz and 50 MHz. This part of the electromagnetic spectrum belongs more or less to the lower range of the ISM frequency band which is reserved internationally for industrial, scientific and medical (ISM) purposes and available for unlicensed use. This part and also higher parts of the ISM band are also used by other wireless communication technologies such as for example in cordless phones, bluetooth devices, near field communication (NFC) devices, garage door openers, baby monitors and wireless computer networks (WiFi).

Most preferably, the transceivers are adapted for a communication at a frequency between 10 MHz and 15 MHz. This is the frequency range that is also used by the NFC (near field communication) technology, which is a technology that enables two electronic devices to establish communication over comparably short distances of usually less than a meter. NFC is however not a single well defined standard, but a set of different standards having different prerequisites, communication protocols etc. And NFC is not suited for the wireless communication required in the invention for several reasons. Firstly, NFC does for example not work in a highly disturbed environment as present in the invention, where the transceivers are located close to the primary and secondary pads that are used for the power transfer. Secondly, the protocols, data rates and the timing of the communication do not fit the needs of the invention, for example regarding a closed loop control of the power transfer. Furthermore, NFC does allow for high error rates and has in addition usually no high need for collision avoidance. Both properties contradict the application of the invention. Moreover, the primary pad does not only emit the energy field for the power transfer, but it unintentionally also emits noise. Both the intentional energy field as well as the unintentional noise massively affect the wireless communication between the pads. A standard NFC antenna placed somewhere close to such a wireless charging system would induce high voltages at the frequency of the energy transfer, which could damage the NFC transceiver. And the noise would corrupt the data transfer. And some NFC standards, for example those defined for larger communication distances up to one meter, are designed for a simplex communication and do therefore usually not allow a duplex or half-duplex communication as required in the invention.

Accordingly, the transceivers must be designed to be robust against the power field frequency and the noise created by the primary.

One aspect of the transceiver design is the placement of the antennas. It would generally be possible to position the antennas somewhere outside the pads but within their communication range to allow data exchange. However, in such an arrangement, it may happen that, although the charging station and the vehicle may communicate with each other, no power transfer is possible because the primary pad and the secondary pad are displaced or otherwise too far apart to transfer power.

In order to ensure that power transfer is possible from the primary to the secondary as soon as communication is established, the antennas of the transceivers are preferably arranged such that the wireless communication occurs through the airgap. This is best achieved by including the antenna into the respective primary or secondary pad.

In a further preferred embodiment of the invention, the transceivers are adapted such that their communication range is restricted to the spatial area right in front of the pad. Or in other words, communication is not possible if one of the transceivers is arranged outside the lateral limits of the other pad. In such an embodiment, the communication range is restricted to a cylindrical area created by the mental shift of the boundaries of the sending pad perpendicular to that pad in the direction of the receiving pad.

Best results in this respect are achieved, if the antenna of a transceiver, preferably of both transceivers, is not arranged in a region near the edge of the pad, but in a central region of the respective pad, i. e. the pad of the primary or secondary unit to which the receiver belongs.

Placing the antenna in the center of the power transfer coil of a pad has the advantage that the wireless power transfer as well as the wireless communication is independent of the orientation of the pads. As long as the antennas are facing each other, it does for example not matter if the pads are not oriented in the same direction but are arranged twisted against each other.

If the antenna is placed near the edge of the pads, it is important that the pads have the correct orientation relative to each other such that power transfer and communication may occur at the same time. If one of the pads is for example slightly twisted relative to the other pad, either the communication or the power transfer or even both may not work.

Independent of the relative orientation of the pads, power transfer as well as wireless communication may of course only work if the primary pad and the secondary pad are positioned such that the antennas in the center of the pads are correctly arranged with respect to each other. The term correctly arranged thereby means that the pads are arranged within the allowed tolerances. These tolerances may for example include allowed values for the deviations regarding the distance of the pads as well as the amount of offset in the two directions parallel to the pads. Or in other words, with just one antenna in the primary and one in the secondary the entire position tolerance of the wireless power transfer system can be addressed.

The antenna of a transceiver is for example and preferably arranged on top of the power coil or coils of the respective pad where the top side of those coil or coils designates the side that is directed to the other pad during power transfer.

Accordingly, the transceivers are preferably adapted such that their communication range is not only restricted to the spatial area right in front of the pad but is in addition more or less symmetrical with respect to an axis running through the center of the pad.

And of course, the simultaneous power transfer and communication may only work if the communication range of the antennas is at least slightly larger than the range of the power transfer field. Or in other words, to ensure that the communication between the primary and the secondary may take place, the transceiver is preferably designed such that a spatial extension of the communication range is larger than a distance between the primary and the secondary pad during charging.

In this connection, the term distance refers to the distance between the pads in a direction perpendicular to the respective pad during charging. However, the communication range does not have to be much larger than the distance between the pads, it is sufficient that it only slightly extends beyond the range of the power transfer field.

With such a placing of the antenna in the center of the pads, most of the physical space wherein the communication is taking place is the same physical space wherein the power transfer is done. So the fields of the communication and the power transfer do overlap.

Due to this overlap, the communication must be robust against the power field frequency and the noise created by the primary side, i. e. by the pad and/or by the other electronic components of the primary side.

In order to avoid that the antenna is damaged by the power field, the antenna of a transceiver, preferably of both transceivers, includes at least one coil that is shaped and arranged such that a resulting voltage induced in the at least one coil by the magnetic field during the power transfer is minimised. Or in simple words, the antenna is designed and arranged such that the resulting voltage induced in the antenna coil or coils by the magnetic field for the power transfer is zero or close to zero.

Due to such a design of the antenna, the power transmission field and the communication antenna do not interfere or damage each other.

There are generally two different ways to implement such an antenna. Either the antenna is designed such that as little as possible of the magnetic flux is flowing through the coil or coils of the antenna. Or the antenna includes two or more coils that are arranged such that the magnetic fluxes flowing through these coils compensate each other as far as possible. When designing the antennas the shape and arrangement of the respective pads has to be considered too.

In a first embodiment, the primary pad for example includes two power coils arranged next to each other in a common plane, wherein during the power transfer a current is flowing in a first coil of the power coils in one direction and a current is flowing in an opposing direction in a second coil of the power coils. Such a coil arrangement often is referred to as a DD coil arrangement. The magnetic field generated by such a coil arrangement therefore flows in the opposite direction through the two coils, but in the center of the pad, the field is essentially parallel to the common plane of the coils. The coils may be formed by a single, common wire or they may be formed by different wires and each coil may include one or more turns. In such a case, the antenna preferably includes a ring-shaped coil that is arranged in parallel to the common plane including the power coils. Or in other words, because the ring-shaped coil of the antenna is arranged in the center of the pad, it is arranged parallel to the magnetic field lines wherefore no or very little magnetic flux of the magnetic field flows through the ring-shaped antenna coil.

Depending on the particular application, the ring-shaped coil may either have a single turn or it may include two or more turns.

In another embodiment, the primary pad includes a ring-shaped power coil that induces a magnetic field that is more or less homogeneous in the centre of the primary pad. Again, the power coil may include one or more turns. In this case, the transceiver antenna includes an eight-shaped coil, i. e. a coil that includes two serially connected rings formed by a single wire where both rings have an opposite sense of circulation. When such an antenna coil is arranged in the power field, a first ring of the eight-shaped coil picks up the magnetic field wherefore a first voltage is induced in that first ring and the second ring of the eight-shaped coil also picks up the magnetic field wherefore a second voltage is induced in that second ring having the opposite sign. Or in other words, the voltage in the first ring caused by the magnetic field results in a current flow in the opposite direction than the current flow in the second ring resulting from the voltage induced by the magnetic field in the second ring such that the currents compensate each other entirely or at least to a large extent.

In another preferred embodiment of the invention the controller is adapted to establish a closed control loop for a closed-loop control of the power transfer, wherein the closed control loop includes the wireless communication link.

The controller that controls the power transfer may be arranged in the primary unit or in the secondary unit. In order to correctly and efficiently control the power transfer, the controller has to be able to control the generation of the magnetic field in the primary thereby considering information from the secondary such as for example battery state of charge (battery SOC), the battery voltage, a charging current set point, a charging voltage set point, a charging power set point. The controller may also require further process data like actual current, temperatures and status information from both sides, log data or power consumption data and so on.

Accordingly, if the controller is arranged in the primary, at least some of the above mentioned information that is generated in the secondary has to be transferred to the controller in the primary. This is done by sending the corresponding information in form of data from the secondary transceiver to the primary transceiver through the wireless communication link. Likewise, for controlling the power transfer, the controller may consider further information generated directly in the primary. The term generated thereby may include measuring, reading out, calculating or otherwise determining the required information. The information generated in the primary may however be directly provided to the controller for example by corresponding wired, optical or other connections suited to transfer data. Based on all or a part of the above mentioned information, the controller may control the power transfer for example by controlling the power conversion from the grid to the AC power that is fed to the primary pad such as the frequency, the phase and/or the amplitude of the AC voltage or current. The controller may also control the power transfer by controlling the generation of the magnetic field by the primary pad by for example controlling the resonance frequency of the resonant circuit of the primary pad.

If the controller is however arranged in the secondary, the information generated directly in the secondary may be directly provided to the controller. However, at least some of the above mentioned information that is generated in the primary has to be transferred to the controller in the secondary via the wireless communication link. And the control signals for controlling the power transfer that are determined by the controller do have to be transferred to the primary in order to control the power conversion from the grid to the AC power and/or to control the primary pad accordingly.

Accordingly, by using the wireless communication link for transferring the required information from the primary to the secondary and/or from the secondary to the primary during the power transfer, the controller closes the control loop and may therefore efficiently perform a closed loop control of the power transfer from the primary to the secondary.

The controller is however preferably arranged in the primary unit, i. e. in the charging station. In this way, it is sufficient to provide one single controller for controlling the power transfer from that charging station to any number of vehicles. If the controller would be arranged in the secondary, i. e. in the vehicle, each vehicle would have to include such a controller.

In a further preferred embodiment of the invention, at least one of the transceivers is adapted for a half-duplex communication such as for example a time division duplex communication. This is for example accomplished in that the transceiver is adapted to switch between a transmit mode and a receive mode, which may for example be realised by a switch that connects the antenna either to a transmitter portion of the transceiver or to a receiver portion of the transceiver.

Preferably, of course both transceivers are adapted accordingly.

Instead of providing a transceiver that may be switched between a transmit mode and a receive mode, separate transmitter and receiver units may be provided, each having its own antenna. Such an arrangement would generally also allow for a full-duplex communication between the primary and the secondary, which might however also require additional measures to avoid interferences or other disturbances that result from the simultaneous data transmission in both directions.

Usually, a transceiver includes an antenna matching circuit in order to match the antenna input impedance to the impedance of the radio module connected to the antenna. The better the matching is, the higher is the power transferred by the antenna, or the transmitted power may be reduced to achieve the same communication range, and the higher becomes the sensitivity of the receive circuit. Such matching circuits usually include inductive or capacitive elements connected in parallel and/or series.

Whereas a matching circuit usually just serves to match the impedances, the antenna matching circuit in a preferred embodiment of the invention not only serves for matching purposes but also includes a first high-pass filter for damping the frequency of the magnetic field for the power transfer.

In a preferred embodiment of the invention, the first high-pass filter includes one or more capacitive elements connected in series. The matching circuit may however also include further elements connected in series and/or in parallel such as to provide the required matching and resulting in a desired cutoff frequency of the first high-pass filter. The cutoff frequency of the first high-pass filter for example has to be above the frequency of the magnetic field produced by the primary pad which may depend on the particular application. In some applications, the frequency of the magnetic field for example is somewhere between a couple of kHz and some hundreds of kHz.

In a power transfer system wherein the power transfer field for example has a frequency of 50 kHz and wherein the communication frequency is for example between 10 MHz and 15 MHz, the high-pass filter is designed with a cutoff frequency between 100 kHz and 5 MHz.

In order to extract the data out of the communication signal that is transmitted through a communication link, a transceiver usually also includes a modulation/demodulation circuit (modem). This modem also provides the extracted data for further prosecution, usually as a digital signal.

Whereas a modem usually just serves to extract the transmitted data, the modem in a preferred embodiment of the invention not only serves for data extraction and providing a digital signal that is representative of the extracted data, but the modem also includes a second high-pass filter for further damping or even blocking the frequency of the magnetic field for the power transfer.

The second high-pass filter preferably includes an RC circuit provided at the input of the modem. The RC circuit for example includes a termination resistor in parallel and a capacitor in series.

Again, the second high-pass filter is designed such that its cutoff frequency is above the frequency of the magnetic field.

Moreover, elements of the antenna matching circuit and the cable matching circuit together may also function as a high-pass filter. Such a high-pass filter may for example be provided by the series capacitor of the antenna matching circuit and the parallel resistor of the cable matching circuit.

In a further preferred embodiment of the invention, the modem additionally includes an amplifier for amplifying an output of the second high pass filter, an envelope detector for generating an envelope signal of the output of the amplifier, a low pass filter for removing noise from an output of the envelope detector and a comparator for converting an output of the low pass filter into the digital signal. The comparator for example compares the received and filtered signal to a reference voltage to extract the data from the received signal.

The communication between the primary and the secondary is however not only influenced by the magnetic field and the noise, but it also depends on the distance and the lateral offset of the primary and the secondary pad. Particularly, the amplitude of the received signal varies in dependency on the distance between the antennas as well as in dependency on other conditions such as for example the environmental conditions like the presence of other electromagnetic fields. In another preferred embodiment of the invention, the reference signal is therefore adjusted for each new power transfer, during a power transfer or even for each communication such as for example prior to each transmission of a communication message. To adjust the reference signal, the sending transceiver transmits a defined signal sequence such as for example a signal that is high for a predetermined amount of time and then low for a predetermined amount of time. From the received signal, the receiving transceiver determines the level of the low signal as well as the level of the high signal and therefrom determines the reference level, for example to be exactly between the received low and high levels. The signal sequence may of course also include other sequences of high and low signals suitable to determine therefrom the high and low levels of the received signal and the reference level.

Other modem architectures may however be used as well.

The solution of the invention regarding the primary or secondary pad is as follows. The primary or secondary pad according to the invention, i. e. a primary or secondary pad for a wireless power transfer arrangement as described above includes the antenna of the corresponding wireless transceiver.

As outlined further above, it is advantageous to include the antenna of the transceiver provide into the respective pad such that that the wireless communication during power transfer occurs through the airgap between the primary and the secondary pad.

The solution of the invention regarding the method for a wireless power transfer is as follows. Such a method includes the steps of inducing a magnetic field into the airgap with a primary pad of a primary unit, receiving the power transferred through the magnetic field with a secondary pad of a secondary unit that is comprised by the vehicle and providing a wireless communication link between the primary unit and the secondary unit. According to the invention the method further includes the steps of providing the wireless communication link with a communication range that is less than twice a largest spatial extent of the primary pad and controlling the wireless power transfer by transmitting data through the wireless communication link during the power transfer.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

Preferred Embodiments

Figure 1:
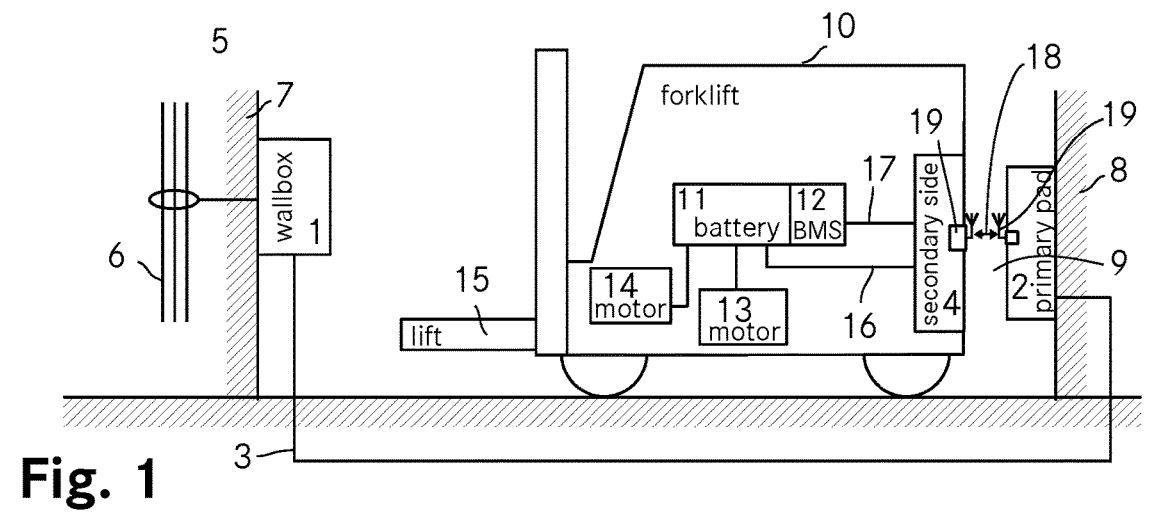
FIG. 1 a schematic representation of a charging application with a wireless charging system according to the invention.

FIG. 1 shows the use of a wireless power transfer arrangement according to the invention for charging the traction battery 11 of a vehicle. In this example, the vehicle is a forklift 10 that is electrically driven by an electric motor 13.

The primary side of the wireless power transfer arrangement includes a wallbox 1 and a primary pad 2. The wallbox 1 is mounted on a wall 7 of a premises 5 such as for example a garage, a car port, a charging station a parking area or the like. The wallbox 1 is connected to the power supply network 6 of the premises 5 from which it receives the energy that is to be transferred to the vehicle. The primary pad 2 is mounted on another wall 8 of or near the premises 5 and is connected to the wallbox 1 by means of a fixed cable 3. The primary pad 2 may be integrated partly or fully into the wall 8 such that it would require less or no extra space near the wall 8. The primary pad 2 may also be mounted on the same wall 7 as the wallbox 1. Or the primary pad 2 and the wallbox 1 may be integrated into the same housing. The primary pad 2 may also be arranged horizontally on the ground of the garage, car port, parking area or the like.

The forklift 10 includes the secondary side 4 of the power transfer arrangement which comprises the secondary pad as well as some further electronics and power electronics to convert and provide the energy received from the primary pad 2 for further use within the forklift 10.

The wallbox 1 receives energy from the power supply network 6, converts it into an AC power and provides it to the primary pad 2 via the cable 3. The primary pad 2 generates a magnetic field that is directed into the airgap 9 between the primary pad 2 and the secondary side 4 of the forklift 10 that is positioned near the primary pad 2 to wirelessly receive the energy transferred through the magnetic field. The power transfer from the primary side to the secondary side 4 is controlled by a controller (not shown in FIG. 1) included in the wallbox 1. The controller may however also be included in the primary pad 2 or in the secondary side 4.

The forklift 10 further includes a battery 11 with a BMS 12 (battery management system) and two electric motors 13, 14 that are fed with energy from the battery 11. The motors 13, 14 may however also be directly fed with energy from the primary side. The electric motor 13 is used for driving the forklift 10 and the electric motor 14 is used for driving the lift 15 of the forklift 10. The BMS 12 manages the energy flow into and usually also out of the battery 11.

For providing the charging current to the battery 11 of the forklift 10, the secondary side 4 is connected to the battery 11 via the charging line 16 and the secondary side 4 is also connected to the BMS 12 by signal line 17. For charging the battery 11 the BMS 12 defines the charging current allowed or needed at a particular point in time and provides this set value to the secondary side 4 via the signal line 17, for example to a charging controller (not shown) included in the secondary side 4. The secondary side 4 for example measures the actual current provided to the battery 11, compares the actual current with the set current and calculates therefrom an error signal that is transmitted to the wallbox 1 via a wireless communication link 18 established by the wireless transceivers 19. Or formulated more generally, the information needed for controlling the charging of the battery 11 by the controller is exchanged between the wallbox 1 and the secondary side 4 via the wireless communication link 18. Based on these information, the controller then controls the primary side such that the required amount of power is transferred to the secondary side.

One of the transceivers 19 is included in the secondary side 4 and one of the transceivers 19 is included in the primary pad 2. The antenna of each transceiver 19 may of course also be separated by the transceiver electronics and connected thereto by means of a suitable cable.

As the distance between the primary pad 2 and the secondary side 4 is in the range of some centimeters to a maximum of some decimetres, the transceivers 19 are adapted for a rather short communication range. The transceivers are designed such that their maximum communication range is slightly higher than the distance between the primary pad 2 and the secondary side 4 during power transfer. In this way, it is ensured that no other transceiver of another vehicle or of another primary side may receive the signals sent between the transceivers 19.

Figure 2:
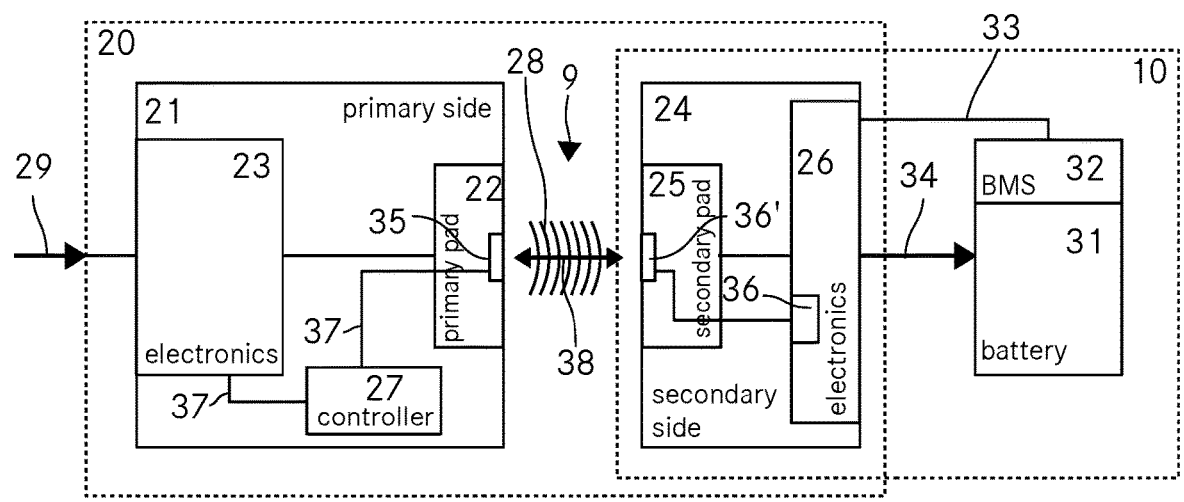
FIG. 2 a block diagram of a wireless charging system according to the invention.

FIG. 2 shows a block diagram of a wireless charging system 20 according to the invention.

The wireless charging system 20 includes a primary side 21 and a secondary side 24. The primary side 21 further includes a controller 27 for controlling the power transfer from the primary side 21 to the secondary side 24. And the primary side 21 includes an electronics part 23 for converting an input power 29 from a power grid into an AC power and a primary pad 22 that receives the AC power from the electronics part 23 and generates a magnetic field 28 therefrom to wirelessly transmit power across the airgap 9. The secondary side 24 includes a secondary pad 25 which picks up the magnetic field 28 and converts the power received through the magnetic field 28 into an AC output power. The secondary side 24 further includes an electronics part 26 that is connected to the secondary pad 25 and converts the AC output power to an output power which is then provided at an output of the wireless power transfer arrangement 20 as an output power 34.

The secondary side 24 is comprised by a vehicle 10 and the output power 34 is provided to a battery 31 of the vehicle 10 for charging the battery 31. In this case, the output power 34 is a DC output power. Power flow into and out of the battery 31 is controlled by a BMS 32 that communicates with the secondary side 24 via a communication link 33. The electronics part 26 for example includes a charging controller that communicates with the BMS 32 in order to control the power flow from the secondary side 24 to the battery 31. As the BMS 32 as well as the secondary side 24 are comprised by the vehicle 10, the communication link 33 is a wired communication link such as for example a CAN-Bus. The BMS 32 therefore controls the power flow into and out of the battery 31 and accordingly provides the secondary side 24 with the information required therefor such as the set points for power, current and/or voltage and the like.

In order to establish communication between the primary side 21 and the secondary side 24, both sides include a transceiver 35, 36 that provides a wireless communication channel 38. The transceiver 35 in the primary side 21 is included in the primary pad 22. Depending on the requirements of a particular application, the antenna and the electronics of the transceiver 35 may also be separated and connected to each other via a suitable cable. The transceiver 36 in the secondary side 21 is included in the electronics part 26 and its antenna 36' is arranged in the secondary pad 25 and connected to the transceiver 36 by a suitable cable. Depending on the requirements of a particular application, the antenna and the electronics of the transceiver 36 may also be implemented as a single unit integrated into the secondary pad 25. Accordingly, the wireless communication channel 38 between the primary side 21 and the secondary side 24 runs through the airgap 9 and accordingly through the magnetic field 28 for the power transfer.

The controller 27 controls the power transfer from the primary side 21 to the secondary side 24 over the airgap 8 such as to meet the requirements of the application, in this case the requirements of the vehicle, and in particular the requirements of the BMS 32 and possibly also further requirements from other sources. The controller 27 controls the primary side 21 for example to meet a certain output power 34 requested by the BMS 32.

In order to receive the required information and to transmit the corresponding control signals to the relevant components, the controller 27 is connected within the primary side 21 to the electronics part 23 as well as to the transceiver 35 via communication lines 37 and further via the wireless communication channel 38 also to the secondary side 24. The communication within the primary side, i. e. between the controller 27, the electronics part 23 and the transceiver 35 and possibly further components may be implemented by a wired communication technology such as for example a CAN-Bus.

The information received from the controller 27 may for example include battery SOC and voltage, a charging current, voltage and/or power set point usually also comprises further data such as actual currents, voltages and/or powers, temperatures and status information from both sides, log data or power consumption data and so on.

In such a configuration, the control signals for example include the signals to control the power conversion within the electronics part 23, the generation of the magnetic field 28 by the primary pad 22 and may also include signals to control the generation of the output power 34 by the secondary side 24. For converting the input power 29 the electronics part 23 usually includes a converter arrangement that for example includes an AC/DC stage, a DC link and a DC/AC inverter that provides the AC power provided to the primary pad 22. The control signals then for example also include the signals to control the switching of the switches of the inverter. The controller 27 may however also control other parts and components of the wireless charging system 20.

Figure 3:
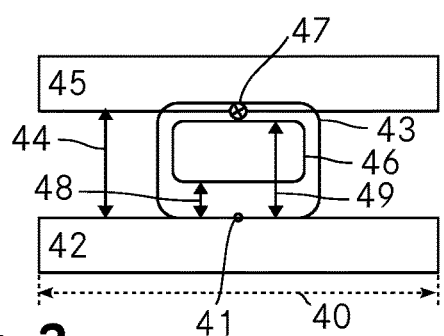
FIG. 3 a schematic representation of the communication range and the power transmission range with a larger distance between the primary and the secondary pad.
Figure 4:
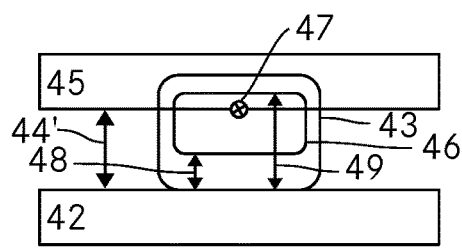
FIG. 4 a schematic representation of the communication range and the power transmission range with a shorter distance between the primary and the secondary pad.

FIGS. 3 and 4 show a schematic representation of the communication range and the power transmission range between a primary pad 42 and the secondary pad 45. The transceivers or their antennas respectively are not shown.

FIG. 3 shows the pads 42, 45 arranged at a larger distance 44 and in FIG. 4 shows them arranged at a shorter distance 44'. Both fig. also show the communication range 43 of the primary pad 42 as well as the power transfer range 46 of the primary pad. It can be seen that in a direction perpendicular to the pads 42, 45 the power transfer range 46 does not start on the surface of the primary pad 42, but at a distance 48 above the primary pad 42. The distance 48 is for example about 100 mm. And the power transfer range 46 extends to a certain distance 49 above the primary pad 42. The distance 49 is for example about 150 mm. The extension of the communication range 43 perpendicular to the pads 42, 45 is larger than the maximum extension of the power transfer range 46 in that direction. It can further be seen that the extension of the communication range 43 in parallel to the pads 42, 45 is smaller than the length of pads 24, 45.

In FIG. 3 it can be seen that the distance 44 between the primary pad 42 and the secondary pad 45 is smaller than the communication range 43 but larger than the reach of the power transmission range 46. Accordingly, the pads may communicate with each other but no power transfer is possible. Further, FIG. 3 shows that the communication range 43 is smaller than the diagonal of the pads 42, 45. As the diagonal of the pads 42, 45 is not visible in FIG. 3, the length 40 of the pads 42, 45 is shown which is clearly smaller than the communication range 43. And since the length is equal or smaller than the diameter of the pads 42, 45, independent of the shape of the pads 42, 45, the communication range 43 is smaller than the diagonal of the pads 42, 45. The comparison of the length 40 with the communication range 43 that is shown as a spatial area is simply done by comparing the distance of each spot within the communication range 43 from the sender. As is schematically shown in FIG. 3, the position 41 of the sender is on top and in the center of the pad 42.

In FIG. 4, the distance 44' between the primary pad 42 and the secondary pad 45 is smaller than the communication range 43 and it is smaller than the reach of the power transmission range 46. Accordingly, the pads may not only communicate with each other but also a power transfer from the primary pad 42 to the secondary pad 45 is possible.

FIGS. 3 and 4 further show the position of a reference 47 at the secondary pad 42. The reference 47 is positioned in the center of the secondary pad 45 and on the surface of the pad 62 that is directed towards the primary pad 42. Accordingly, a power transfer from the primary pad 42 to the secondary pad 45 is possible and efficient as soon as the reference 47 is within the power transfer range 46. As can be seen, the pads 42, 45 may also be horizontally displaced relative to each other for a certain distance, i. e. parallel to the pads 42, 45, before the reference 47 is outside of the power transfer range 46.

Figure 5:
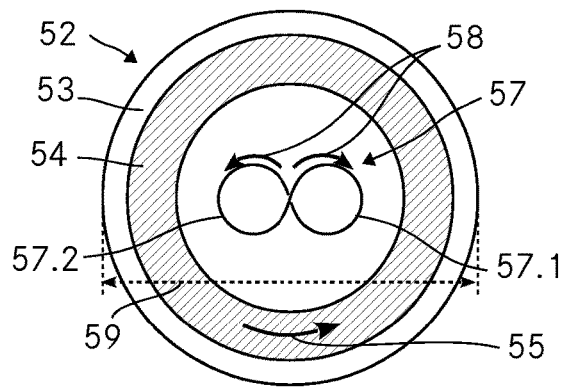
FIG. 5 a schematic representation of a primary pad with an antenna for the communication between the primary and the secondary side from above.
Figure 6:
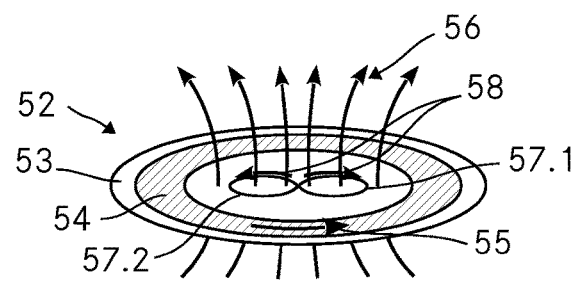
FIG. 6 the primary pad with the communication antenna as shown in FIG. 7 viewed from the side up.

FIGS. 5 and 6 show a schematic representation of a primary pad 52 with a circular coil 53 and an antenna 57 for the communication between the primary and the secondary side. FIG. 5 is a view from above and FIG. 6 is a view from the side up.

The primary pad 52 includes a generally circular ferrite core sheet 53 and a circular coil 54 arranged on the ferrite core sheet 53 having a diameter 59 that corresponds to the diameter of the circular ferrite core sheet 53. The current flowing within the coil 54 is shown by the arrow 55 to flow in the counterclockwise direction. During power transfer, the current flow in the coil 54 generates a magnetic field 56 shown by the field lines in FIG. 6 that run through a central area of the coil 54.

In the center of the primary pad 52, the antenna 57 of the corresponding transceiver (not shown) is arranged. The antenna 57 includes a coil with two antenna coil rings 57.1, 57.2 that are connected to each other such that they form an 8-shaped coil. The arrows 58 show the resulting direction of the current flowing within the 8-shaped coil separately for the two antenna coil rings 57.1, 57.2 as caused by the voltages induced in the antenna rings 57.1, 57.2 by the magnetic field 56.

As can be seen, the magnetic flow through both coil rings 57.1, 57.2 is equal, as long the antenna 57 is arranged in the center of the coil 54, i. e. in the center of the pad 52. As the two coil rings 57.1, 57.2 have a different sense of circulation, the induced voltage in both coil rings 57.1, 57.2 is equal but they have different signs such that they compensate each other. The resulting voltage within the antenna 57 induced by the magnetic field 56 is therefore zero or at least very near to zero, independent of the strength of the magnetic field.

Figure 7:
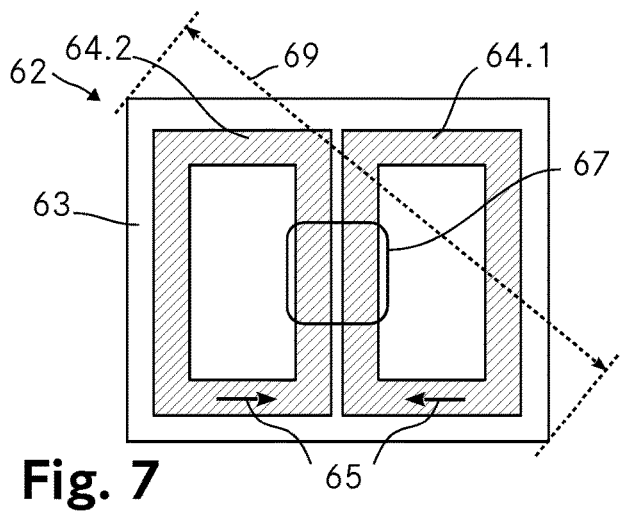
FIG. 7 a schematic representation of another primary pad with a communication antenna from above.
Figure 8:
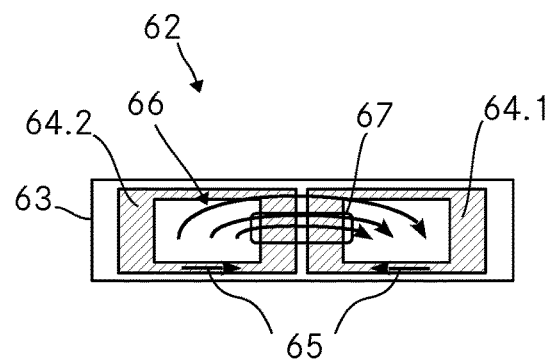
FIG. 8 the primary pad with the communication antenna as shown in FIG. 9 viewed from the side up.

FIGS. 7 and 8 show a schematic representation of another primary pad 62. FIG. 7 is a view from above and FIG. 8 is a view from the side up.

The primary pad 62 includes a generally rectangular ferrite core sheet 63 and a power coil with two coils 64.1, 64.2 arranged next to each other on the ferrite core sheet 63. In a central region of the pad 62, the turn or turns of the coils 64.1, 64.2 run in parallel. The primary pad 62 has a diameter 69 that corresponds to the diagonal of the rectangular ferrite core sheet 63.

The primary pad 62 is designed such that the current flowing in one coil 64.1 runs in the opposite direction than the current flowing in the other coil 64.2. Whereas the current in the coil 64.1 runs in the clockwise direction, the current in the coil 64.2 runs in counterclockwise direction as shown by the arrows 65. Accordingly, during power transfer, the current flow in the coils 64.1, 64.2 generate a magnetic field 66 as shown by some field lines in FIG. 8. The magnetic field 66 runs from below the pad 62 up through the coil 64.2, over to coil 64.1, back to below the pad 62 through the coil 64.1 and underneath the pad 62 over to coil 64.2. The resulting magnetic field 66 in the center of the pad 62 directly above the pad is therefore generally parallel to the pad 62.

The antenna 67 of the corresponding transceiver (not shown) is arranged exactly in the center of the primary pad 62 and directly on top of it. The antenna 67 includes a single circular coil. Accordingly, the antenna 67 is arranged essentially in parallel with the field lines of the magnetic field 66 generated by the power coils 64.1, 64.2. But even if some flux lines of the magnetic field 66 flow through the coil of the antenna 67 these flux lines run back through the coil of the antenna 67 because the magnetic field 66 generated by the power coils 64.1, 64.2 above the ferrite core sheet 63 is generally symmetrical with respect to a plane perpendicular to and arranged between the coils 64.1, 64.2. Therefore, hardly any resulting magnetic flux flows through the antenna 67 coil such that essentially no voltage is induced in the antenna 67 coil originating by the power transfer field.

Figure 9:
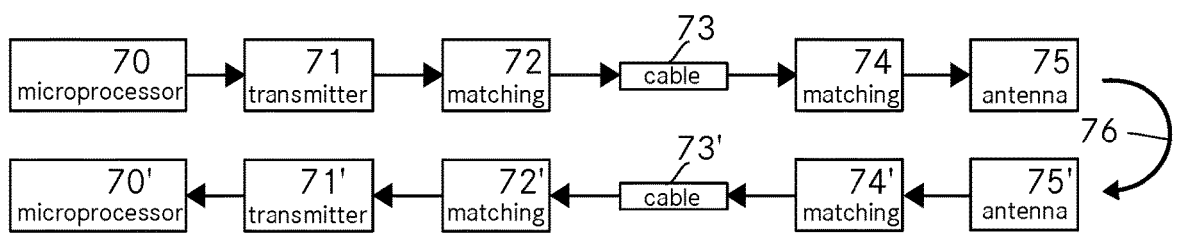
FIG. 9 a block diagram of a transceiver for use in the invention.

FIG. 9 shows a block diagram of a communication system for use in the invention. The communication system includes a first microprocessor 70 that provides the data to be transmitted to a transmitter electronic 71. The transmitter electronic 71 is connected to a sending antenna 75 via a cable 73, where a cable matching circuit 72 is provided between the transmitter electronic 71 and the cable 73 and an antenna matching circuit 74 is provided between the cable 73 and the sending antenna 75. The data is then wirelessly transmitted to a receiving antenna 75' via wireless transmission 76, provided to a receiver electronic 71' via a cable 73' where an antenna matching circuit 74' is provided between the receiving antenna 75' and the cable 73' and a cable matching circuit 72' is provided between the cable 73' and the receiver electronic 71'. The receiver electronic 71' provides the transmitted data to a microprocessor 70' for further processing.

Whereas FIG. 9 shows just a single direction of communication, namely from the microprocessor 70 to the microprocessor 70', the communication system may also transmit data in the other direction from the microprocessor 70' to the microprocessor 70 in the same way. The components of the communication system are adapted for such a two way communication.

Figure 10:
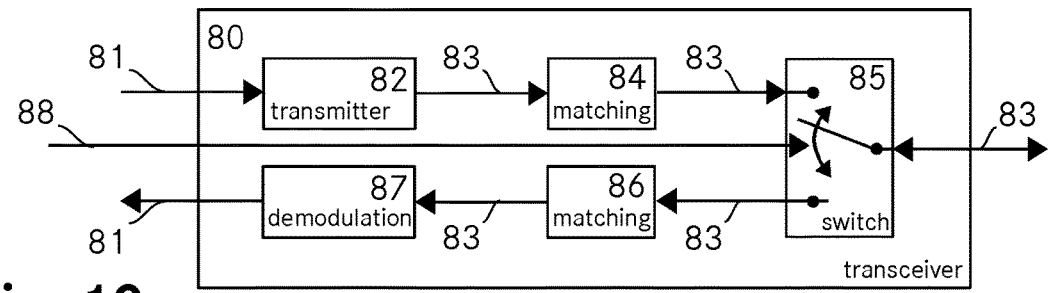
FIG. 10 a block diagram of a transceiver for use in the invention.

FIG. 10 shows a block diagram of a transceiver 80 for use in the invention. In the transmit path the transceiver 80 includes a transmitter 82, a cable matching circuit 84 and a RF (radio frequency) switch 85. The transmitter 82 receives the data 81 from a microprocessor or the like (not shown) and prepares the data 81 for transmission such as for example by modulating it with a suitable modulation technique. The resulting transmission signal 83 is provided to the RF switch via a cable matching circuit 84 and further to the RF switch 85. An antenna cable (not shown) connects the RF switch of the transceiver 80 to an antenna (not shown) to transmit the transmission signal 83. In order to transmit the transmission signal, the RF switch 85 is controlled by means of a control signal 88 to go into transmit mode, i. e. to connect the transmit path to the antenna cable that connects the transceiver to the antenna. The control signal 88 for example is received from a microprocessor too.

In the receive path the transceiver includes a cable matching circuit 86 and a demodulation circuit 87. In order to receive a transmission signal 83 sent by another transceiver, the RF switch 85 is controlled via the control signal 88 to go to receive mode, i. e. to connect the antenna cable to the cable matching circuit 86. Then, the received transmission signal 83 is demodulated by the demodulation circuit 87 and that extracted data 81 is provided for further use. The data 81 is for example provided to a microprocessor for further processing.

Figure 11:
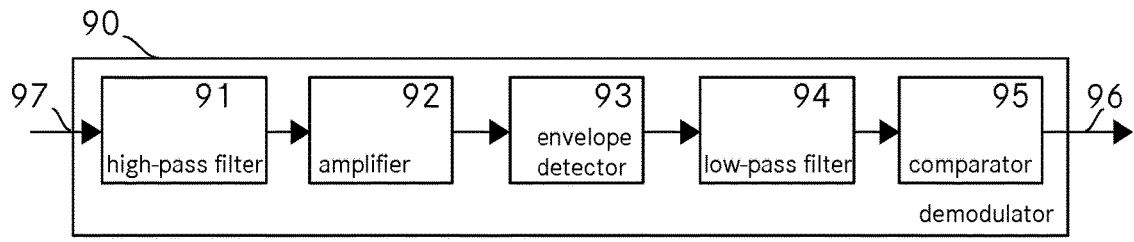
FIG. 11 a block diagram of a demodulator for use in the invention.

FIG. 11 shows a block diagram of a demodulator 90 for use in the invention. The received RF signal 97 received via the antenna of the transceiver that includes the demodulator 90 has for example been provided to the demodulator 90 via the antenna matching circuit, an antenna cable and a cable matching circuit.

In order to extract the data transmitted via the transmission signal 97 the demodulator 90 includes a high-pass filter 91 at its input, followed by an amplifier 92, i. e. an RF amplifier that amplifies the received and high-pass filtered RF signal 97. The amplifier 92 is followed by an envelope detector 93 including a rectifier, a low-pass filter 94 and a comparator 95 for generating a digital signal 96 representative of the data transmitted with the received transmission signal 97. The digital signal 96 is then provided for further processing, for example to a microprocessor.

Figure 12:
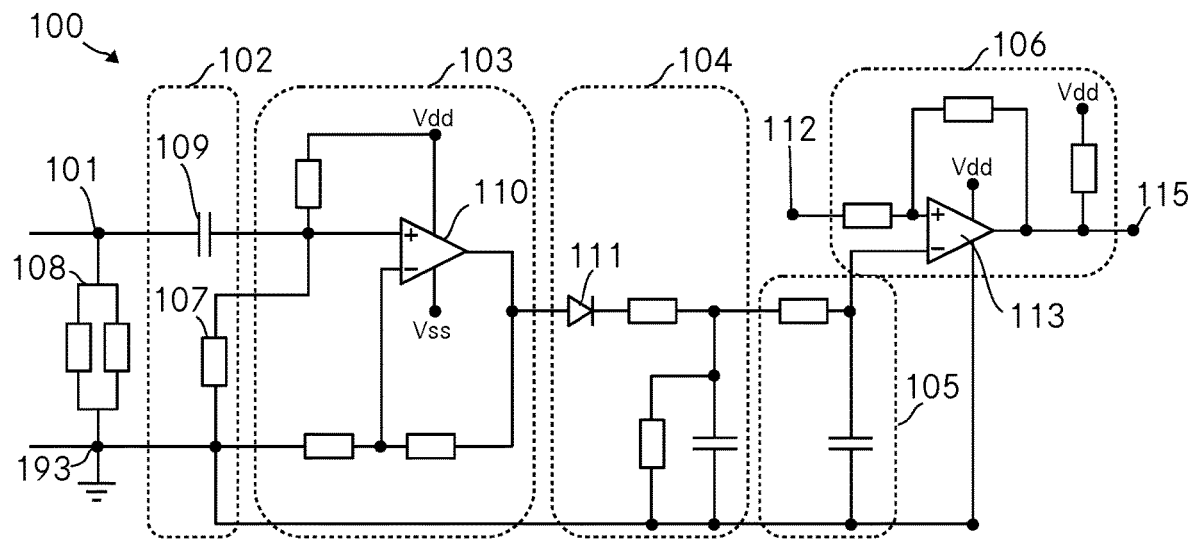
FIG. 12 a schematic representation of an electric circuit of a demodulator for use in the invention.

FIG. 12 shows a schematic, representation of an exemplary electric circuit 100 of a demodulator for use in the invention.

The electric circuit 100 includes a high-pass filter 102 at the input 101, followed by an amplifier 103. The output of the amplifier 103 is provided to an envelope detector 104 that is followed by a low-pass filter 105. Finally, the output of the low-pass filter 105 is provided to the input of a comparator 106 that generates the digital output signal 115 representative of the data received at the input 101.

The high-pass filter 102 at the input 101 includes an RC circuit with a series capacitor 109 and a resistor 107 at the input of the amplifier 103. In the embodiment shown in FIG. 12, the parallel resistor 108, realised here in form of two parallel resistors, is the line termination resistor of the RF cable that connects the demodulator to the antenna. The amplifier 103 amplifies the received signal by means of an opamp 110 (operational amplifier), the output of which is connected to the envelope detector 104 that detects the envelope of the received and amplified signal by means of a diode 111. The output of the envelope detector 104 is then provided to the low-pass filter 105 that removes high frequencies from the rectified envelope signal. The low-pass filter includes for example an RC circuit with a series resistor and a parallel capacitor. To extract the data out of the received signal, the low-pass filtered signal is compared to a reference signal 112. This is done by means of a comparator 106 that includes an opamp 113 wherein the reference signal 112 is connected to the positive input of the opamp 113 and wherein the low-pass filtered envelope signal is connected to the negative input of the opamp 113. The output of the opamp 113 provides the resulting digital signal 115 supplied at the output of the electric circuit 100.

The level of the reference signal may for example be fixed, determined for each new charging process or, preferably, determined for each message that is to be transmitted by sending an initial signal sequence, measuring the high and low levels of the received signals and therefrom determining the level of the reference signal to best differentiate between the high and the low levels of the received signal.

Figure 13:
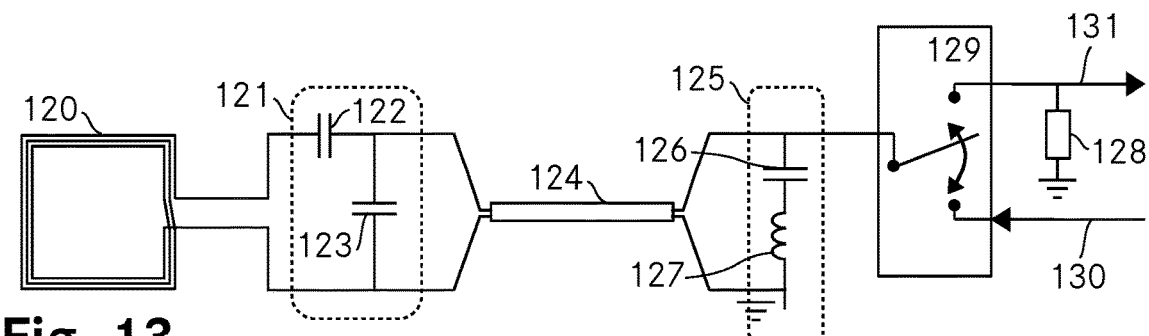
FIG. 13 a schematic representation of an antenna and a corresponding cable for use in the invention and FIG. 14 a schematic representation of a transmitted and the corresponding demodulated signal.

FIG. 13 shows another example of an antenna and a corresponding cable for use in the invention. FIG. 13 shows an antenna 120 connected to the antenna matching circuit 121 that includes a series capacitor 122 and a parallel capacitor 123. The antenna 120 in this example is a circular antenna with three turns wherein the most outer turn and the most inner turn are connected to the antenna matching circuit 121. The antenna matching circuit 121 is connected to a filter 125 for the power transfer field via a cable 124. The filter 125 includes a series circuit of a capacitor 126 and an inductance 127 connected across the terminals of the cable 127. As already outlined above, the transceivers are adapted to switch between a transmit mode and a receive mode. To do so, a RF switch 129 is shown in FIG. 13 connected to the filter 125. The switch 129 accordingly is controlled, for example by a microprocessor, either to connect the transmit path 130 to the cable 124 or to connect the receive path 131 to the cable 124. It is to note that the receive path 131 in this example also includes a termination resistor 128.

In this example, the antenna matching circuit 121 and the termination resistor do not only serve for matching purposes, but the capacitor 122 of the antenna matching circuit 121 and the termination resistor 128 together do form a kind of high-pass filter that suppresses the frequencies of the power transfer field in the communication signal received through the power transfer field.

Figure 14:
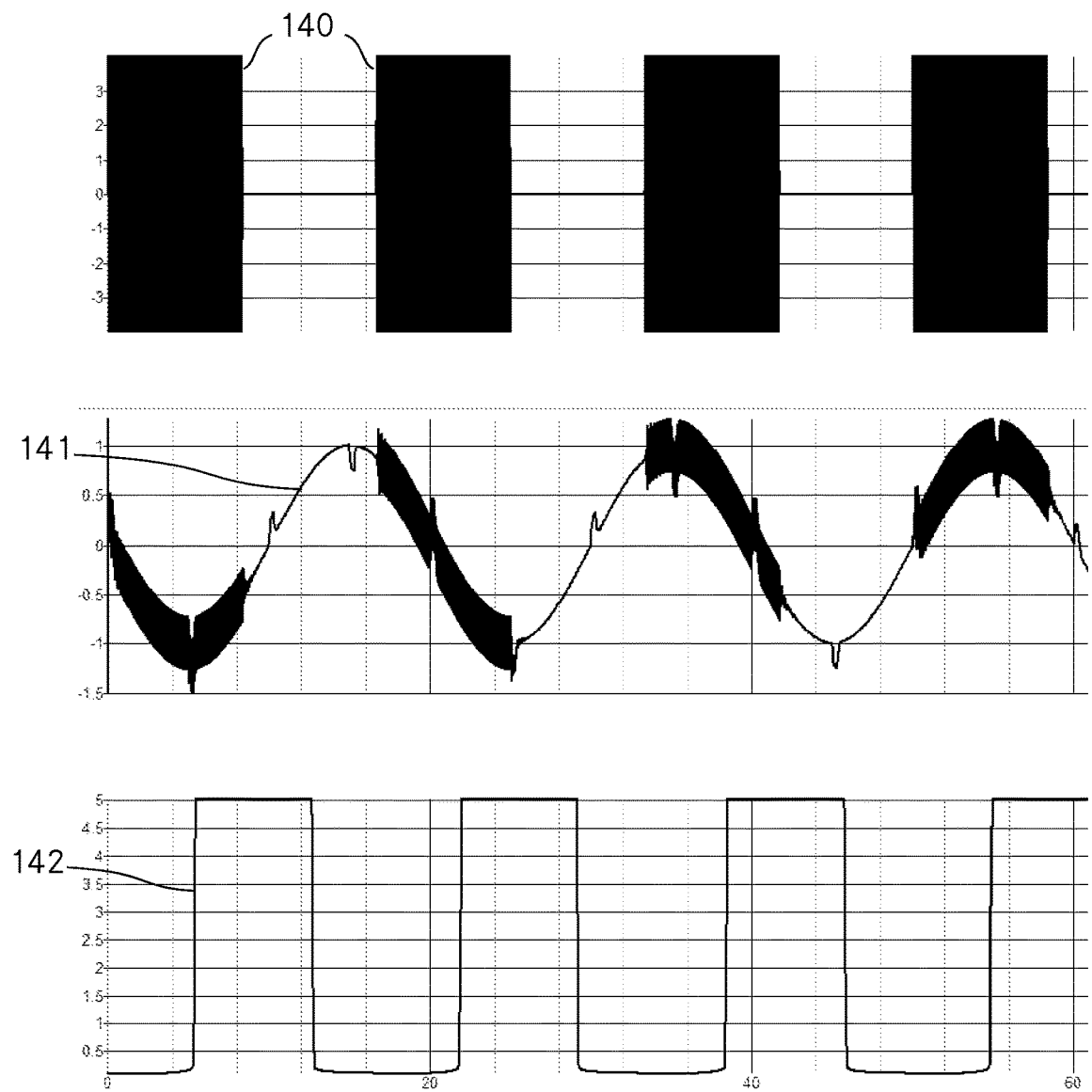

FIG. 14 shows a schematic representation of a transmitted and the corresponding demodulated signal. On the horizontal axis time is represented with 20 µs (microseconds) per division.

The transmitted signal 140 is a modulated signal with a carrier frequency of 13.56 MHz, which is the same frequency as used by the NFC protocol. The transmitted signal 140 is shown in the upper part of FIG. 14 with 1 V (Volt) per division on the vertical axis. A positive bit is represented by a signal section with an amplitude of about 4 V and a negative bit is represented by a signal section with an amplitude of 0 V. The amplitude of the positive bits may also have a different amplitude, wherein the amplitude may be fixed or wherein the amplitude is dynamically adapted for each new power transfer or even during a power transfer. And as known in the art, a negative bit may also be represented by a signal section with a non-zero amplitude that is different from the amplitude of a positive bit. And furthermore, the representation of the positive and negative bits may also be inverted such that a positive bit is represented by a small or zero amplitude and a negative bit is represented by a high amplitude.

The middle part of FIG. 14 further shows the received signal 141, i. e. the signal received at the input of the demodulation circuit. The received signal 141 is shown with 0.5 V per division on the vertical axis and having an amplitude of about 1 V. It can be seen that, although the signal has been transmitted through the power transfer field and has also been influenced by noise, the power transfer field and the noise are attenuated to a high extent such that the demodulation results in a clearly decoded digital signal 142 as shown in the lower part of FIG. 14 with 0.5 V per division on the vertical axis and with a signal level of 5 V. The digital signal 142 is then forwarded for example to a microprocessor for further processing. As can be seen, the decoded digital signal 142 just has a certain delay compared to the transmitted signal 140.

In summary, it is to be noted that the invention not only enables a simplified pairing process prior to the power transfer from a primary side to a secondary side, it also enables a simple and rather safe communication between the primary and the secondary side during the power transfer, despite the bad circumstances arising from the presence of the high magnetic field during the power transfer.

The invention claimed is:

1. A wireless power transfer arrangement used by an electric vehicle for a wireless power transfer across an airgap by inductive coupling for charging an energy storage used by the electric vehicle, wherein
  a) the wireless power transfer arrangement includes a primary unit, a secondary unit and a controller for controlling the power transfer, wherein
  b) the primary unit includes a wireless transceiver and a primary pad for inducing a magnetic field into the airgap, wherein
  c) the secondary unit includes a wireless transceiver and a secondary pad for receiving the power transferred through the magnetic field, wherein
  d) the wireless transceivers include an antenna for transmitting and receiving a communication signal via a wireless communication link between the primary unit and the secondary unit, wherein
  e) the wireless communication link has a communication range that is less than twice a largest spatial extent of the primary pad, wherein the controller is adapted to control the power transfer based on data transmitted through the wireless communication link during the power transfer, wherein the controller is adapted to establish a closed control loop for a closed-loop control of the power transfer, wherein the controller is adapted to control the inducing of the magnetic field by the primary unit based on parameters of the energy storage, and wherein the closed control loop includes the wireless communications link.

2. The wireless power transfer arrangement according to claim 1, wherein the energy storage includes a battery, particularly a traction battery of the vehicle.

3. The wireless power transfer arrangement according to claim 1, wherein the wireless transceivers are adapted for a communication range of less than the largest spatial extent of the primary pad.

4. The wireless power transfer arrangement according to claim 1, wherein the transceivers are adapted for a communication at a frequency between 3 kHz and 1 GHz.

5. The wireless power transfer arrangement according to claim 1, wherein the antennas of the transceivers are arranged such that the wireless communication occurs through the airgap.

6. The wireless power transfer arrangement according to claim 5, wherein at least one of the antennas is arranged in a central region of the respective pad.

7. The wireless power transfer arrangement according to claim 5, wherein a spatial extension of the communication range is larger than a distance between the primary and the secondary pad during charging.

8. The wireless power transfer arrangement according to claim 5, wherein at least one of the antennas include at least one coil wherein the at least one coil is shaped and arranged such that a resulting voltage induced in the at least one coil by the magnetic field during the power transfer is minimized.

9. The wireless power transfer arrangement according to claim 8, wherein the primary pad includes two power coils arranged next to each other in a common plane, wherein during the power transfer a current is flowing in a first coil of the power coils in one direction and a current is flowing in an opposing direction in a second coil of the power coils, wherein the at least one antenna includes a ring-shaped coil arranged in parallel to the common plane.

10. The wireless power transfer arrangement according to claim 8, wherein the primary pad includes a ring-shaped transmitting coil inducing the magnetic field, wherein at least one of the antennas includes an eight-shaped coil arranged to pick up the magnetic field induced by the ring-shaped transmitting coil.

11. The wireless power transfer arrangement according to claim 1, wherein at least one of the transceivers is adapted for a half-duplex communication, wherein the at least one transceiver is adapted to switch between a transmit mode and a receive mode.

12. The wireless power transfer arrangement according to claim 1, wherein at least one of the transceivers includes an antenna matching circuit with a first high pass filter for damping a frequency of the magnetic field for the power transfer, wherein the first high pass filter includes one or more capacitive elements connected in series.

13. The wireless power transfer arrangement according to claim 1, wherein at least one of the transceivers includes a modulation/demodulation circuit for extracting the data out of the communication signal and providing a digital signal representative of the extracted data, wherein the modulation/demodulation circuit includes a second high pass filter for damping a frequency of the magnetic field for the power transfer, wherein the second high pass filter includes an RC circuit.

14. The wireless power transfer arrangement according to claim 13, wherein the modulation/demodulation circuit further includes an amplifier for amplifying an output of the second high pass filter, an envelope detector for generating an envelope signal of the output of the amplifier, a low pass filter for removing noise from an output of the envelope detector and a comparator for converting an output of the low pass filter into the digital signal.

15. A primary or secondary pad for the wireless power transfer arrangement according to claim 1, wherein the primary or secondary pad includes the antenna of the corresponding wireless transceiver.

16. The wireless power transfer arrangement according to claim 3, wherein the wireless transceivers are adapted for a communication range of more than 5 centimeters.

17. The wireless power transfer arrangement according to claim 4, wherein the transceivers are adapted for a communication at a frequency between 300 kHz and 300 MHz.

18. The wireless power transfer arrangement according to claim 17, wherein the transceivers are adapted for a communication at a frequency between 3 MHz and 50 MHz.

19. A method for a wireless power transfer across an airgap by inductive coupling for charging an energy storage of an electric vehicle, the method including the steps of
a) inducing a magnetic field into the airgap with a primary pad of a primary unit,
b) receiving the power transferred through the magnetic field with a secondary pad of a secondary unit comprised by the vehicle,
c) providing a wireless communication link between the primary unit and the secondary unit,
d) providing the wireless communication link with a communication range that is less than twice a largest spatial extent of the primary pad and controlling the wireless power transfer by transmitting data through the wireless communication link during the power transfer, and
e) establishing a closed control loop for a closed-loop control of the power transfer, the closed-loop control comprising controlling the inducing of the magnetic field by the primary unit based on parameters of the energy storage, wherein the closed control loop includes the wireless communication link.

* * * * *